US006429181B2

(12) United States Patent
Sweeny et al.

(10) Patent No.: US 6,429,181 B2
(45) Date of Patent: Aug. 6, 2002

(54) PARTIALLY HALOGENATED HYDANTOINS IN PAPERMAKING APPLICATIONS

(75) Inventors: Philip Gerdon Sweeny, Hackettstown, NJ (US); Daniel Wayne Lemke, Jersey Shore, PA (US); Michael Leonid Ludensky, Randolph, NJ (US)

(73) Assignee: Lonza Inc., Fair Lawn, NJ (US)

( * ) Notice: Subject to any disclaimer, the term of this patent is extended or adjusted under 35 U.S.C. 154(b) by 0 days.

(21) Appl. No.: 09/774,254

(22) Filed: Jan. 30, 2001

Related U.S. Application Data

(60) Provisional application No. 60/179,056, filed on Jan. 31, 2000.

(51) Int. Cl.$^7$ .................. C11D 77/04; C07D 233/02
(52) U.S. Cl. ..................... 510/382; 548/320.5
(58) Field of Search .................. 548/320.5; 510/382

(56) References Cited

U.S. PATENT DOCUMENTS

| | | | |
|---|---|---|---|
| 3,328,294 A | 6/1967 | Self et al. ............... | 210/62 |
| 3,749,672 A | 7/1973 | Golton et al. ............ | 252/95 |
| 4,235,599 A | 11/1980 | Davis et al. ............. | 252/99 |
| 4,297,224 A | 10/1981 | Macchiarolo et al. ...... | 210/62 |
| 4,382,799 A | 5/1983 | Davis et al. ............. | 8/107 |
| 4,427,692 A | 1/1984 | Girard .................. | 424/273 R |
| 4,537,697 A | 8/1985 | Girard .................. | 252/90 |
| 4,654,424 A | 3/1987 | Girard et al. ........... | 548/311 |
| 4,698,165 A | 10/1987 | Theyson ................ | 210/755 |
| 5,061,373 A | 10/1991 | Gallup ................. | 210/697 |
| 5,565,109 A | 10/1996 | Sweeny ................ | 210/755 |
| 5,565,576 A | 10/1996 | Hall et al. ............. | 548/317.1 |
| 5,603,941 A | 2/1997 | Farina et al. ........... | 424/405 |
| 5,750,061 A | 5/1998 | Farina et al. ........... | 264/117 |
| 5,859,040 A | 1/1999 | King et al. ............. | 514/389 |

FOREIGN PATENT DOCUMENTS

| | | | |
|---|---|---|---|
| EP | 0 647 596 | 4/1995 | ........... C02F/5/10 |
| JP | SH065-31492 | 3/1981 | ........... C02F/1/76 |
| JP | 08176996 | 7/1996 | ........... D21H/21/04 |

OTHER PUBLICATIONS

Database WPI, Section Ch, Week 199637, Derwent Publications Ltd., London, GB; AN 1996–368915, XP002169825—and JP 08 176996 A (Great Lakes Chem Corp.), Jul. 9, 1996.
"Substitution in the Hydantoin Ring. III. Halogenation"; Corral et al., J. Org. Chem., 28:1100 (1963).
"N–Halogen Compounds I. Decomposition of 1,3–Dichloro–5,5–dimethylhydantoin in Water at pH 9"; Peterson et al., J. Org. Chem 24:1414 (1959).

*Primary Examiner*—Ceila Chang
*Assistant Examiner*—Andrea D. Small
(74) *Attorney, Agent, or Firm*—Darby & Darby

(57) ABSTRACT

The inventors have discovered that partially halogenated hydantoins exhibit superior antimicrobial efficacy and decreased performance additive decomposition rates than fully halogenated hydantoins, such as dichlorodimethyl hydantoin (DCDMH). Partially halogenated hydantoins are solutions containing monochlorohydantoin and, optionally, dihalogenated hydantoin or non-halogenated hydantoin. The present invention is a method of reducing slime in a circulating water slurry comprising organic matter and one or more performance additives, such as optical brighteners, while minimizing decomposition of the performance additives. The method comprises adding one or more partially halogenated hydantoins, such as $Cl_{1.1}$-chlorodimethyl hydantoin, to the slurry. The concentration of partially halogenated hydantoin maintained in the slurry generally ranges from about 0.01 to about 50 ppm (expressed as $Cl_2$). This method is particularly useful for circulating water slurries in paper processing.

28 Claims, No Drawings

PARTIALLY HALOGENATED HYDANTOINS IN PAPERMAKING APPLICATIONS

This application claims the benefit of U.S. provisional patent application No. 60/179,056, filed on Jan. 31, 2000, which is incorporated herein by reference.

FIELD OF THE INVENTION

The present invention relates to the use of partially halogenated hydantoins to reduce slime in a circulating water slurry containing organic matter and one or more performance additives, such as optical brighteners, while minimizing decomposition of the performance additives.

BACKGROUND OF THE INVENTION

Sodium hypochlorite, chlorine gas, and fully halogenated hydantoins, such as dihalogenated dialkyl hydantoins, are known circulating water slimicides. In paper processing, these slimicides often cause decomposition of expensive performance additives, such as optical brighteners. This results in decreased product quality and process efficiency and increased costs. For example, decomposition of an optical brightener will result in a reduction in the brightening of the paper.

Brightness is a critical control parameter in paper production. Chemicals which interact with optical brighteners cause fluctuations in the brightness of paper produced. In order to control these fluctuations, increased monitoring and process adjustment is required, resulting in increased personnel and equipment costs. Therefore, it is desirable to use slimicides which do not, or minimally, interact with optical brighteners.

Furthermore, the interaction between the slimicide and other performance additives, such as sizing, dyes, wet strength additives, dry strength additives, retention aids, and drainage aids, often results in degeneration of one or both of the slimicide and the performance additives. Thus, it is desirable to use slimicides which do not, or minimally, degrade performance additives while maintaining slimicidal activity.

Fully halogenated hydantoins have previously been used as slimicides in papermaking and textile applications. See, e.g., U.S. Pat. Nos. 4,235,599; 4,297,224; 4,427,692; 4,560,766; 4,654,424; 5,565,576; 5,603,941; and 5,750,061.

U.S. Pat. No. 3,328,294 discloses the use of a N-chlorosulfamate solution prepared by reacting sulfamic acid with a hypochlorite solution for disinfecting paper-processing streams. Enhanced biocidal efficacy is demonstrated over a non-oxidizing biocide containing N-methyldithiocarbamate and cyanodithioimidocarbonate. Unfortunately, as a practical matter, N-chlorosulfamic acid is less effective as a biocide than hypochlorites, thus limiting its desirability as a papermaking slimicide.

U.S. Pat. No. 3,749,672 discloses the use of N-hydrogen materials to formulate bleaching solutions with enhanced stability against spontaneous decomposition. The formulation contains (A) a hypohalite, (B) an N-hydrogen compound, (C) the corresponding N-halo reaction product of (A) with (B), and (D) a buffer to maintain the pH of the formulation between 4 and 11. The N-halo reaction product is present in the formulation at a concentration of $1.0 \times 10^{-3}$ to 1.0 molar.

U.S. Pat. No. 4,382,799 discloses the use of organo-N-chloro compounds, such as an N-chlorinated-5,5-dialkyl hydantoin, and organo-N-bromo compounds for bleaching textiles.

U.S. Pat. No. 4,537,697 discloses aqueous solutions containing a fully halogenated hydantoin and a solubilizing agent, such as magnesium oxide, barium hydroxide, sodium bicarbonate, sodium carbonate, and 5,5-dialkylsubstituted hydantoins.

U.S. Pat. No. 5,565,109 discloses specific N-hydrogen compounds, such as 5,5-dimethylhydantoin, which improve the bactericidal efficacy of hypochlorite solutions, such as sodium hypochlorite in pulp slurries. This reduces the amount of hypochlorite required to achieve biological control. Minimization of chlorine usage reduces the predisposition for adsorbable organic halogen formation.

Japanese Patent No. 08176996 discloses hydantoin slimicides, such as 1-bromo-3-chloro-5,5-dimethyl hydantoin, dibromodiethyl hydantoin, 1,3-dibromo-5,5-dimethyl hydantoin, and 1,3-dichloro-5,5-dimethyl hydantoin, which are effective at a pH of 4 to 8. These dihalohydantoin compounds, however, have been found to significantly degrade and reduce the efficacy of performance additives used in papermaking.

Japanese Patent Application No. Sho 56[1981]-31492 discloses the use of hydantoins to stabilize chlorine solutions.

There is a need for compositions that exhibit enhanced slimicidal efficacy and do not, or minimally, degrade performance additives, such as optical brighteners.

SUMMARY OF THE INVENTION

The inventors have discovered that partially halogenated hydantoins exhibit superior antimicrobial efficacy and decreased performance additive decomposition rates than fully halogenated hydantoins, such as dichlorodimethyl hydantoin (DCDMH). Partially halogenated hydantoins are solutions containing monochlorohydantoin and, optionally, dihalogenated hydantoin or non-halogenated hydantoin.

The present invention is a method of reducing slime in a circulating water slurry comprising organic matter and one or more performance additives, such as optical brighteners, while minimizing decomposition of the performance additives. The method comprises adding one or more partially halogenated hydantoins, such as $C_{1.1}$-chlorodimethyl hydantoin, to the slurry. The concentration of partially halogenated hydantoin maintained in the slurry generally ranges from about 0.01 to about 50 ppm (expressed as $Cl_2$). This method is particularly useful for circulating water slurries in paper processing.

DETAILED DESCRIPTION OF THE INVENTION

The inventors have discovered that in circulating water slurries containing a performance additive, partially halogenated hydantoins provide superior microbiocidal efficacy per mole of halogen consumed by the performance additive compared to their fully halogenated analogs.

The term "partially halogenated hydantoin" is defined herein as a solution, which may be a liquid, such as an aqueous slurry, or solid, containing halogenated hydantoins and, optionally, non-halogenated hydantoins having a degree of halogenation greater than 0 but less than 2. The degree of halogenation is the average number of halogen atoms associated with each hydantoin molecule in the solution. Generally, a halogenated hydantoin having a degree of halogenation of 0<x<1 is a mixture of (non-halogenated) hydantoin and monohalo hydantoin at a molar ratio of 1-x:x. A halogenated hydantoin having a degree of halogenation of 1<x<2 is generally a mixture of monohalo hydantoin and dihalo hydantoin at a molar ratio of 2-x:x-1. For example, a solution having an average of 1.5 chlorine atoms associated with each hydantoin molecule, i.e., $Cl_{1.5}$ hydantoin, has a degree of halogenation of 1.5. A solution containing $Cl_{1.5}$ hydantoin is a mixture of monochloro hydantoin and dichloro hydantoin at a molar ratio of 1:1. Another example of a partially halogenated hydantoin is $Cl_{0.9}$ hydantoin, which is a mixture of hydantoin and monochloro hydantoin at a molar ratio of 0.1:0.9. The term "solution" as used herein includes, but is not limited to, solids, liquids, and gases.

The partially halogenated hydantoin may be an $X_{(2-n)}$ dialkyl hydantoin, where X is chlorine, bromine, iodine, or a combination thereof and $0<n<2$. According to a preferred embodiment, n ranges from about 0.5 to about 1.5. According to another preferred embodiment, n ranges from about 0.8 to about 1.2. According to yet another preferred embodiment, n is greater than 0.2 but less than 1. According to yet another preferred embodiment, n is greater than 0.75 but less than 0.95. According to yet another preferred embodiment, n is greater than 1 but less than 2. According to yet another preferred embodiment, n is greater than 1.05 but less than 1.4, 1.2, or 1.1. According to yet another preferred embodiment, n is about 0.9 or 1.1. According to yet another embodiment, n is about 1.

The alkyl moieties of the partially halogenated hydantoin may be the same or different. A suitable hydantoin has the formula

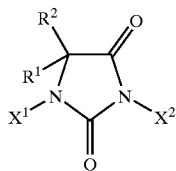

where $X^1$ and $X^2$ are independently hydrogen or halogen and $R^1$ and $R^2$ are independently linear or branched $C_1$–$C_{10}$ alkyl. $R^1$ and $R^2$ may be the same or different. $R^1$ and $R^2$ are preferably a $C_1$–$C_4$ alkyl.

The partially halogenated hydantoin is preferably $X_{(2-n)}$ di-($C_1$–$C_{10}$) alkyl hydantoin, more preferably $X_{(2-n)}$ di-($C_1$–$C_4$) alkyl hydantoin, and most preferably $X_{(2-n)}$ dimethyl hydantoin or $X_{(2-n)}$ methylethyl hydantoin. Preferred partially halogenated hydantoins include, but are not limited to, $Cl_{0.5}$-5,5-dimethyl hydantoin, $Cl_{0.9}$-5,5-dimethyl hydantoin, $Cl_{1.1}$-5,5-dimethyl hydantoin, $Cl_{1.05-1.4}$-5,5-dimethyl hydantoin, monochloro-5,5-dimethyl hydantoin (MCDMH), $Br_{0.9}$-5,5-dimethyl hydantoin, monobromo-5,5-dimethyl hydantoin (MBDMH), $Cl_{0.5}$-5-methyl-5-ethyl hydantoin, $Cl_{0.9}$-5-methyl-5-ethyl hydantoin, $Cl_{1.1}$-5-methyl-5-ethyl hydantoin, $Cl_{1.05-1.4}$-5-methyl-5-ethyl hydantoin, monochloro-5-methyl-5-ethyl hydantoin, $Br_{0.9}$-5-methyl-5-ethyl hydantoin, monobromo-5-methyl-5-ethyl hydantoin, and any combination of any of the foregoing. Special mention is made of $Cl_{0.9}$-chloro-5,5-dimethyl hydantoin, $Cl_{0.9}$-5-methyl-5-ethyl hydantoin, $Cl_{1.1}$-chloro-5,5-dimethyl hydantoin, and $Cl_{1.1}$-5-methyl-5-ethyl hydantoin.

Another preferred partially halogenated hydantoin is $Cl_aBr_b$-5,5-dimethyl hydantoin, where a and b independently range from about 0.1 to about 1 and the sum of a and b is less than 1, 1.5, or 2. Preferably, a ranges from about 0.5 to about 1 and b ranges from about 0.1 to about 0.5. A preferred partially halogenated hydantoin of this formula is $Cl_{0.75}Br_{0.25}$-5,5-dimethyl hydantoin.

The partially halogenated hydantoin may be a solid. The term "solid" includes, but is not limited to, powders, granules, tablets, briquettes and slurries. Unlike prior two-component liquid slimicides, such as the hydantoin and hypochlorite solutions described in U.S. Pat. No. 5,565,109, processing with solid partially halogenated hydantoins has the following advantages.

(1) Only one feeding/pumping system is required.
(2) No mixing device is required.
(3) Only one stock of material needs to be stored.
(3) Solid spills are more easily contained and reduce the chance of release of chemicals into the environment compared to liquid spills.
(4) Transfer lines for partially halogenated hydantoins remain non-toxic and non-hazardous, since the active halogen concentration in the diluted solutions containing partially halogenated hydantoins is relatively low and the pH of the diluted solutions is near neutral.

Furthermore, concentrates of the partially halogenated hydantoin may contain greater concentrations of active ingredient than typical liquid slimicidal concentrates. For example, a solid concentrate of partially halogenated hydantoin may contain 43% by weight of the partially halogenated hydantoin (expressed as $Cl_2$) based upon 100% total weight of concentrate. In contrast, liquid concentrates of sodium hypochlorite typically comprise only about 12% by weight of active ingredient based upon 100% total weight of concentrate. Additionally, the partially halogenated hydantoins of the present invention are stable, unlike most bleaches currently sold.

The amount of the partially halogenated hydantoin added to the slurry is generally sufficient to maintain the concentration of partially halogenated hydantoin in the slurry at from about 0.01 to about 50 ppm (expressed as $Cl_2$). The concentration of partially halogenated hydantoin maintained in the slurry is typically a slimicidally effective amount. Preferably, the concentration of partially halogenated hydantoin maintained in the slurry is from about 0.1 to about 5 ppm (expressed as $Cl_2$).

The partially halogenated hydantoin may be added directly to the circulating water slurry as a solid or as an aqueous solution. The concentration of partially halogenated hydantoin in such an aqueous solution typically ranges from about 0.001 to about 2% by weight and preferably from about 0.005 to about 0.2% by weight, based upon 100% weight of total solution. The partially halogenated hydantoin may be added as a solid to the circulating water slurry.

The partially halogenated hydantoin may also be mixed with a biodispersant, including, but not limited to, any of those described below, prior to being added to the circulating water slurry. The biodispersant enhances the efficacy of the partially halogenated hydantoin as a slimicide and assists in maintaining the surfaces of the container in which the slurry is contained clean. Generally, such a mixture contains from about 80 to about 99.99% by weight of partially halogenated hydantoin and from about 0.01% to about 20% by weight of biodispersant, based upon 100% total weight of mixture. According to another embodiment, the mixture contains from about 90 to about 99.99% by weight of partially halogenated hydantoin and from about 0.01% to about 10% by weight of biodispersant, based upon 100% total weight of mixture.

The partially halogenated hydantoin may be prepared in solution by mixing the monohalogenated hydantoin with the non-halogenated hydantoin and/or the dihalogenated hydantoin at an appropriate molar ratio to obtain the desired degree of halogenation.

Partially halogenated hydantoins may be prepared in solid form by the following method. An aqueous solution of the desired non-halogenated hydantoin(s) at the desired mole ratios is prepared, such as by the method described in U.S. Pat. No. 4,560,766, which is hereby incorporated by reference. The solution may optionally contain a desired molar concentration of bromide or iodide if a bromine or iodine containing hydantoin is desired. This solution is halogenated with chlorine gas or another oxidant (such as sodium hypochlorite) which has a higher oxidation potential than bromide or iodide if either is present. This causes the bromide or iodide present (if any) to be converted to an oxidation state of +1 and it to bond to the hydantoin. Any excess chlorine based oxidant introduced will also bind to the hydantoin. The oxidant, such as chlorine gas, may be introduced into the solution by any method known in the art, such as bubbling it into the solution. The amount of oxidant added is that which is desired in the final formulation. The solution is precipitated or dried in order to isolate the resulting partially halogenated hydantoin mixture. The partially halogenated hydantoin mixture may be further purified by methods known in the art, such as by filtering or centrifugation.

For example, $Cl_{0.85}Br_{0.25}$ hydantoin containing a mixture of 5,5-methylethylhydantoin (MEH) and 5,5-dimethylhydantoin (DMH) may be prepared as follows. A solution containing 0.2 moles of MEH and 0.8 moles of DMH is prepared. 0.25 moles of sodium bromide is added to the solution. The solution is then halogenated with 1.1 moles of chlorine gas. The resulting partially halogenated hydantoin is isolated. The molar ratio of MEH to DMH in the resulting mixture is 0.2:0.8.

Another method for preparing partially halogenated hydantoins in solid form is as follows. An aqueous solution of the desired non-halogenated hydantoin(s) at the desired mole ratios is prepared. An appropriate amount of dihalogenated hydantoin is added and the solution is stirred until equilibrium is reached, such as, for example, for about 4 hours at about 22° C. The solution is precipitated or dried and the partially halogenated hydantoin is isolated.

For example, a mole of $Cl_{1.5}$ hydantoin may be prepared as follows. A solution containing 0.25 moles of 5,5-dimethylhydantoin is prepared. 0.75 moles of 1,3-dichloro-5,5-dimethylhydantoin is added to the solution. The resulting solution is stirred for 4 hours at room temperature. The partially halogenated hydantoin is then isolated by precipitation or drying. This method is also described in Petterson, R. C., and Grzeskowiak, V., *J. Org. Chem.*, 24,1414 (1959) and Corral, R. A., and Orazi, O. O., *J. Org. Chem.*, 28, 1100 (1963), both of which are hereby incorporated by reference.

The slurry may be, for example, a papermaking slurry or white water. The slurry may also contain other slimicides as known in the art. In an alternative embodiment, the slurry comprises a slimicidally effective amount of partially halogenated hydantoin and another slimicide.

The performance additive may be any known in the art, such as optical brighteners, dyes, sizing, wet strength additives, dry strength additives, retention aids, drainage aids, biodispersants, and any combination of the foregoing. The term "performance additive" is defined herein as an additive which increases the quality and/or quantity of the product being prepared in the circulating water slurry or the (time or cost) efficiency of a process which uses the circulating water slurry. Suitable performance additives include, but are not limited to, those described in *Papermaking Chemistry*, Ed. Neimo, L., Fapet Oy (1999); Scott, W. E., *Wet End Chemistry*, TAPPI Press (1992); and *Wet- and Dry-strength Additives—Application, Retention, and Performance*, Ed. Spence, G., TAPPI Press (1999), which are hereby incorporated by reference. One class of performance additives is known as performance polymers. Examples of performance polymers include, but are not limited to, polymeric sizing, polymeric wet strength additives, polymeric dry strength additives, polymeric retention aids, polymeric drainage aids, polymeric biodispersants, and the like.

The optical brightener may be any known in the art. Suitable optical brighteners include, but are not limited to, sulfonated stillbenes, such as Tinopal® ABP available from Ciba-Geigy AG of Basel, Switzerland; sulfonated biphenyls; and any combination of any of the foregoing. The slurry typically comprises a brightening effective amount of the optical brightener. The concentration of optical brightener in the slurry preferably ranges from about 0.01 to about 200 ppm (active) and more preferably from about 1 to about 20 ppm.

The sizing may be any known in the art. Sizing is generally used to impart resistance to the paper to wetting and penetration by liquids. A non-limiting example of a sizing is alkyl ketene dimer (AKD), available as Hercon 70® from Hercules Inc. of Wilmington, Del. In paper processing, the slurry typically comprises an effective amount of sizing to increase the wetting and/or penetration resistance of the paper being processed. The concentration of sizing in the slurry preferably ranges from about 1 to about 100 ppm (active) and more preferably from about 5 to about 50 ppm.

The wet strength additive may be any known in the art. Wet strength additives generally increase the wet strength of the paper. A non-limiting example of a wet strength additive is poly (amido-amine)-epichlorohydrin (PAE), available as Discostrength® 5807 from Callaway Chemical Co. of Columbus, Ga. The slurry typically comprises a wet strength increasing effective amount of the wet strength additive. The concentration of wet strength additive in the slurry preferably ranges from about 1 to about 1,000 ppm (active) and more preferably from about 5 to about 100 ppm.

The dry strength additive may be any known in the art. Dry strength additives generally increase the dry strength of the paper. Two non-limiting examples of dry strength additives are anionic polyacrylamide (A-PAM), available as Accostrength 85® from Cytec Industries Inc. of West Patterson, N.J., and cationic starch (C-Starch), available as Redibond 5330® from National Starch & Chemical Company of Bridgewater, N.J. The slurry typically comprises a dry strength increasing effective amount of the dry strength additive. The concentration of dry strength additive in the slurry preferably ranges from about 1 to about 500 ppm (active) and more preferably from about 5 to about 200 ppm.

The retention aid may be any known in the art. Retention aids generally improve the retention of fillers and fines to the paper sheet. A non-limiting example of a retention aid is cationic PAM (C-PAM), available as Accurac 182-RS® from Cytec Industries Inc. of West Patterson, N.J. In paper processing, the slurry typically comprises an effective amount of the retention aid to improve the retention of fillers and/or fines to the paper sheet. The concentration of retention aid in the slurry preferably ranges from about 0.1 to about 10 ppm (active) and more preferably from about 0.2 to about 5 ppm.

The drainage aid may be any known in the art. Drainage aids facilitate water removal from the forming paper sheet. In paper processing, the slurry typically comprises an effective amount of the drainage aid to facilitate water removal from the forming paper. The concentration of drainage aid in the slurry preferably ranges from about 1 to about 500 ppm (active) and more preferably from about 5 to about 200 ppm.

The biodispersant may be any known in the art, such as those disclosed in U.S. Pat. No. 5,603,941, which is hereby incorporated by reference. Biodispersants are substances that aid in the removal or inhibition of the formation of biofilms. Biodispersants are typically surfactants and preferably surfactants with some, but relative to a typical biocide slight, independent biocidal effects. Suitable biodispersants include those in the solid form. Non-limiting examples of biodispersants include surfactants, such as sulfosuccinate and sulfacetate surfactants (including, but not limited to, sodium dioctylsulfosuccinate (SDSS),disodium lauryl sulfosuccinate, sodium lauryl sulfoacetate, or a combination thereof). The slurry typically comprises an amount of biodispersant sufficient to remove or inhibit the formation of biofilms. The concentration of biodispersant in the slurry preferably ranges from about 0.1 to about 100 ppm (active) and more preferably from about 1 to about 5 ppm.

Typical slurries in paper applications contain from 0.2 to 18% by weight of organic matter, based upon 100% total weight of slurry. The organic matter is typically comprised of pulp fiber and fillers and adjuvants, such as sizing and starch. Generally, the organic matter comprises from about 90 to about 99 percent by weight of cellulose fiber, based upon 100% total weight of organic matter.

Generally, the pH of the slurry ranges from about 4.5 to about 10 and is preferably from about 5 to about 8.5.

The following examples are intended to describe the present invention without limitation.

EXAMPLE 1

The decomposition rate of the optical brightener Tinopal® ABP-A Liquid, which is a sulfonated stillbene available from Ciba-Geigy AG of Basel, Switzerland, in the presence of each of the slimicides in Table 1 below was determined as follows.

$Cl_{0.9}$-5,5-dimethyl hydantoin was prepared by mixing a 5.25% (by weight) sodium hypochlorite (NaOCl) mixture, available as Clorox® Bleach, with 5,5-dimethyl hydantoin (DMH), available from Lonza Inc. of Fair Lawn, N.J., at a molar ratio of DMH to NaOCl of about 1.0:0.9.

The slimicide from Table 1 and the optical brightener were mixed in tap water at a temperature of about 20° C. and a pH of about 7–8. The mixture was stirred on a stir plate with aliquots taken at regular intervals over 2 hours and measured for optical brightener concentration and residual slimicide.

The initial concentration of slimicide was about 2.0 ppm (expressed total halogen as $Cl_2$). The initial concentration of optical brightener was about 10 ppm active.

TABLE 1

| Slimicide | Chlorine:Hydantoin Ratio | Optical Brightener Decomposition Rate (ppm/min) |
|---|---|---|
| $Cl_{0.9}$-5,5-dimethylhydantoin | 0.9:1 | 0.04 |
| Dantochlor ®[1] | 2:1 | 0.5 |
| Sodium Hypochlorite Solution[2] | — | 0.6 |

[1]Dantochlor ® is a mixture of 15.1% (w/w) dichloromethylethyl hydantoin and 81.1% (w/w) dichlorodimethyl hydantoin and is available from Lonza Inc. of Fair Lawn, N.J.
[2]The sodium hypochlorite solution is a 5.25% (by weight) solution of NaOCl, which is sold commerically as Clorox ® Bleach.

EXAMPLE 2

The bactericidal efficacy of the slimicides in Table 1 was determined as follows.

White water was obtained from a Northeastern paperboard mill. The pH of the white water was about 6.5–7.5. The consistency of the white water was typically 0.1–0.2%. The furnish pulp was approximately 50% mixed, 15% chip, 15% corrugated, and 15% newspaper. The white water contained the sizing alkyl ketene dimer (AKD). The test organisms were those native to the white water.

The slimicide was added at a concentration of from about 15 to about 20 ppm (expressed as $Cl_2$) to the white water. The white water was then incubated for 3 hours at 37° C. The test conditions were based on ASTM E 600-91 and ASTM E 1839-96. Bacterial counts were performed using tryptone glucose extract agar by known pour late techniques. DIFCO D/E Neutralizing Broth was used as the first serial dilution tube or biocide neutralization.

The results are shown in Table 2 below. The ratio of the bactericidal efficacy to the optical brightener decomposition rate is also shown in Table 2.

TABLE 2

| Slimicide | Halogen to Hydantoin Ratio | Bactericidal Efficacy (log cfu/ml reduction in 3 hours) | Ratio of Bactericidal Efficacy to Optical Brightener Decomposition Rate |
|---|---|---|---|
| $Cl_{0.9}$-5,5-dimethyl hydantoin | 0.9:1 | 3.9 | 98 |
| Dantochlor ® | 2:1 | 3.0 | 6 |
| Sodium Hypochlorite Solution | — | 0.4 | <0.7 |

These results show that the partially halogenated $Cl_{0.9}$-5,5-dimethyl hydantoin composition, when compared to the fully halogenated analogue provides an enhanced bacterial efficacy rate and an enhanced ratio of bactericidal efficacy to optical brightner decomposition rate.

EXAMPLE 3

The procedure in Example 1 was repeated with the slimicides in Table 3 below. The results are shown in Table 3.

Sodium hypobromite (NaOBr) was prepared by mixing a 5.25% (by weight) sodium hypochlorite (NaOCl) mixture, available as Clorox® Bleach, with sodium bromide at a molar ratio of sodium bromide to NaOCl of about 1.1:1.0.

$Br_{0.9}$-5,5-dimethyl hydantoin was prepared by mixing the NaOBr mixture with 5,5-dimethyl hydantoin (DMH), which is available from Lonza Inc. of Fair Lawn, N.J., at a molar ratio of DMH to NaOBr of 1.0:0.9.

TABLE 3

| Slimicide | Bromine:Hydantoin Ratio | Optical Brightener Decomposition Rate (ppm/min) |
|---|---|---|
| $Br_{0.9}$-5,5-dimethyl hydantoin | 0.9:1 | 1.9 |
| NaOBr | — | >3.1 |

These results show that the partially halogenated $Br_{0.9}$-5,5-dimethyl hydantoin composition, when compared to the free halogen analogue, exhibits a decreased optical brightener decomposition rate.

EXAMPLE 4

125 mL solutions containing 2.0 ppm (expressed total halogen as $Cl_2$) of $Cl_{0.9}$-5,5-dimethyl hydantoin, Dantochlor®, sodium hypochlorite, Dantobrom®, or sodium hypobromite and a performance additive described in Table 4 were prepared by mixing the appropriate amounts of the ingredients in tap water at a temperature of about 37° C. and a pH of about 8.

TABLE 4

| Type of Performance Additive | Performance Additive | Active Concentration in the Solution (ppm) |
|---|---|---|
| Wet Strength Additive | Poly (amidoamine)-epichlorohydrin (PAE)[3] | 100 |
| Dry Strength Additives | Anionic polyacrylamide (A-PAM)[4] | 50 |
|  | Cationic Starch (C-Starch)[5] | 100 |
| Retention Aid | Cationic PAM (C-PAM)[6] | 4 |
| Sizing | Alkyl ketene dimer (AKD)[7] | 10 |

[3]A 12.5% active mixture of poly(amidoamine)-epichlorohydrin (PAE) is available as Discostrength ® 5807 from Callaway Chemical Co. of Columbus, GA.
[4]A 22% active mixture of anionic polyacrylamide (A-PAM) is available as Accostrength 85 ® from Cytec Industries Inc. of West Patterson, NJ.
[5]A 40% active mixture of cationic Starch (C-Starch) is available as Redibond 5330 ® from National Starch & Chemical Company of Bridgewater, NJ.
[6]A 30% active mixture of cationic PAM (C-PAM) is available as Accurac 182-RS ® from Cytec Industries Inc. of West Patterson, NJ.
[7]A 12% active mixture of alkyl ketene dimer (AKD) is available as Hercon 70 ® from Hercules Inc. of Wilmington, DE.

The degeneration of the performance additives tested was determined by measuring the residual oxidant (halogen) concentrations of the solutions over time as follows. The tests were performed in a water bath maintained at 37° C. and an orbital shaker in order to keep the performance additives dispersed in the solutions. Aliquots were taken at regular intervals over a 30 minute period and measured for residual slimicide concentrations using the standard diethyl-p-phenylene diamine (DPD) methodology described in Palin, A. T., *Chemistry and Control of Modem Chlorination*, La Motte Chemical (1973). The oxidant (halogen) loss rates were determined from first order linear regression plots of the residual oxidant (halogen) concentrations over time. The results are shown in Table 5.

TABLE 5

| Slimicide | Halogen to Hydantoin Ratio | Oxidant (Halogen) Loss Rate (ppm/min) | | | | |
|---|---|---|---|---|---|---|
| | | PAE | A-PAM | C-Starch | C-PAM | AKD |
| $Cl_{0.9}$-5,5-dimethyl hydantoin* | 0.9:1 | 0.020 | 0.001 | 0.003 | 0.001 | 0.001 |
| Dantochlor ® | 2:1 | 0.026 | 0.000 | 0.006 | 0.006 | 0.005 |
| NaOCl* | — | 0.034 | 0.003 | 0.011 | 0.039 | 0.005 |
| Dantobrom ®[8] | 2:1 | 0.063 | 0.020 | 0.010 | 0.021 | 0.009 |
| NaOBr* | — | 0.103 | 0.029 | 0.010 | 0.025 | 0.003 |

*These slimicides were prepared as described in Examples 1 and 3.
[8]Dantobrom ® is $Cl_{1.5}Br_{0.5}$ hydantoin where the hydantoins are a 20:80 weight ratio of 5-ethyl-5-methyl-hydantoin and 5,5-dimethylhydantoin. Dantobrom ® is available from Lonza, Inc. of Fair Lawn, NJ.

EXAMPLE 5

The bactericidal efficacy of each slimicide in Table 6 was determined according to the procedure described in Example 2, except the incubation time was 30 minutes instead of 3 hours and the initial concentration of slimicide was about 20 ppm (expressed as $Cl_2$).

The bactericidal efficacy rate of each slimicide was determined by dividing the observed log reduction in the bacterial count by the 30 minute contact time. The bactericidal efficacy rate at 2 ppm of slimicide (expressed as $Cl_2$) was extrapolated from the results for 20 ppm of slimicide (expressed as $Cl_2$) by assuming a first order behavior. In other words, the bactericidal efficacy rate at 2 ppm of slimicide was estimated to be one-tenth that at 20 ppm of slimicide.

The results are shown in Table 6.

TABLE 6

| Slimicide | Halogen to Hydantoin Ratio | Bactericidal Efficacy (log cfu/ml reduction in 30 minutes) | Bactericidal Efficacy Rate (log cfu/ml reduction per minute) | Extrapolated Bactericidal Efficacy Rate (at 2 ppm of Slimicide) (log cfu/ml reduction per minute) |
|---|---|---|---|---|
| $Cl_{0.9}$-5,5-dimethyl hydantoin* | 0.9:1 | 3.96 | 0.132 | 0.0132 |
| Dantochlor ® | 2:1 | 3.75 | 0.125 | 0.0125 |
| NaOCl* | — | 0.42 | 0.014 | 0.0014 |

*These slimicides were prepared as described in Example 1.

EXAMPLE 6

The ratio of bactericidal efficacy to oxidant loss rate was calculated for the slimicides and performance additives in Table 7 based on the results in Tables 5 and 6 above. The ratio was calculated by dividing the extrapolated bactericidal efficacy rate at 2 ppm of the slimicide in Table 6 by its oxidant loss rate in Table 5. Where the bactericidal efficacy rate of a slimicide was below the detection limit of 0.001 ppm per minute, the bactericidal efficacy rate was assumed to be 0.001 ppm per minute.

The results are shown in Table 7.

TABLE 7

| Slimicide | Halogen to Hydantoin Ratio | Ratio of Bactericidal Efficacy Rate to Oxidant Loss Rate (log cfu/ml reduction per ppm) | | | | |
|---|---|---|---|---|---|---|
| | | PAE | A-PAM | C-Starch | C-PAM | AKD |
| $Cl_{0.9}$-5,5-dimethyl hydantoin | 0.9:1 | 0.67 | 13.2 | 4.4 | 13.2 | 13.2 |
| Dantochlor ® | 2:1 | 0.48 | >12.5 | 2.1 | 2.1 | 2.5 |
| NaOCl | — | 0.04 | 0.5 | 0.1 | 0.04 | 0.3 |

These results show that $Cl_{0.9}$-5,5-dimethyl hydantoin is more effective in the presence of performance additives which degenerate oxidants than the fully chlorinated hydantoin and sodium hypochlorite.

EXAMPLE 7

The bactericidal efficacy and bacterial efficacy rate of each slimicide in Table 8 below was determined according to the procedure described in Example 5.

The results are shown in Table 8.

TABLE 8

| Slimicide | Halogen to Hydantoin Ratio | Bactericidal Efficacy (log cfu/ml reduction in 30 minutes) | Bactericidal Efficacy Rate (log cfu/ml reduction per minute) | Extrapolated Bactericidal Efficacy Rate (at 2 ppm of Slimicide) (log cfu/ml reduction per minute) |
|---|---|---|---|---|
| $Cl_{0.9}$-5,5-dimethyl hydantoin* | 1:1 | 3.96 | 0.132 | 0.0132 |
| Dantobrom ® | 2:1 | 3.12 | 0.104 | 0.0104 |
| NaOBr* | — | 0.07 | 0.002 | 0.0002 |

*These slimicides were prepared as described in Examples 1 and 3.

EXAMPLE 8

The ratio of bactericidal efficacy to oxidant loss rate was calculated for the slimicides and performance additives in Table 9 based on the results in Tables 5 and 8 above according to the procedure described in Example 6.

The results are shown in Table 9.

TABLE 9

| | | Ratio of Bactericidal Efficacy Rate to Oxidant Loss Rate (log cfu/ml reduction per ppm) | | | | |
|---|---|---|---|---|---|---|
| Slimicide | Halogen to Hydantoin Ratio | PAE | A-PAM | C-Starch | C-PAM | AKD |
| $Cl_{0.9}$-5,5-dimethyl hydantoin | 0.9:1 | 0.67 | 13.2 | 4.4 | 13.2 | 13.2 |
| Dantobrom ® | 2:1 | 0.17 | 0.52 | 1.0 | 0.49 | 1.2 |
| NaOBr | — | 0.002 | 0.007 | 0.02 | 0.008 | 0.07 |

These results show that $Cl_{0.9}$-5,5-dimethyl hydantoin is more effective in the presence of performance additives which degenerate oxidants than the fully halogenated hydantoin Dantobrom® and sodium hypobromite.

EXAMPLE 9

The bactericidal efficacy of each slimicide in Table 10 was determined according to the procedure described in Example 2, except the initial concentration of slimicide was about 10 ppm (expressed as $Cl_2$).

The microbiocidal efficacy rate of each slimicide was determined by dividing the observed log reduction in the bacterial count by the 180 minute contact time. The efficacy rate at 2 ppm of slimicide (expressed as $Cl_2$) was extrapolated from the results for 10 ppm of slimicide (expressed as $Cl_2$) by assuming a first order behavior. In other words, the efficacy rate at 2 ppm of slimicide was estimated to be one-fifth that at 10 ppm of slimicide.

The results are shown in Table 10.

TABLE 10

| Slimicide | Halogen to Hydantoin Ratio | Bactericidal Efficacy (log cfu/ml reduction in 180 minutes) | Bactericidal Efficacy Rate (log cfu/ml reduction per minute) | Extrapolated Bactericidal Efficacy Rate (at 2 ppm of Slimicide) (log cfu/ml reduction per minute) |
|---|---|---|---|---|
| $Cl_{0.5}$ dimethyl hydantoin[9] | 0.5:1 | 4.13 | 0.023 | 0.0046 |
| Dantochlor ® | 2:1 | 3.77 | 0.021 | 0.0042 |
| $Cl_{0.75}Br_{0.25}$ dimethyl hydantoin[10] | 1:1 | 3.61 | 0.020 | 0.0040 |
| Dantobrom ® | 2:1 | 1.50 | 0.008 | 0.0017 |

[9]$Cl_{0.5}$ dimethyl hydantoin was prepared by mixing sodium hypochlorite (NaOCl) with 5,5-dimethyl hydantoin (DMH) at a molar ratio of NaOCl to DMH of about 0.5:1.0.
[10]$Cl_{0.75}Br_{0.25}$ dimethyl hydantoin was prepared by mixing sodium hypochlorite (NaOCl), sodium hypobromite (NaOBr) (prepared as described in Example 3), and 5,5-dimethyl hydantoin (DMH) at a molar ratio of NaOCl:NaOBr:DMH of about 0.75:0.25:1.0.

The ratio of bactericidal efficacy to oxidant loss rate was calculated by the procedure described in Example 6 for the slimicides and performance additives in Table 11. For calculating purposes, the oxidant loss rates for Dantochlor® described in Table 5 were used for $Cl_{0.5}$ dimethyl hydantoin. Also, the oxidant loss rates for Dantobrom® described in Table 5 were used for $Cl_{0.75}Br_{0.25}$ dimethyl hydantoin.

The results are shown in Table 11.

TABLE 11

| | | Ratio of Bactericidal Efficacy Rate to Oxidant Loss Rate (log cfu/ml reduction per ppm) | | | | |
|---|---|---|---|---|---|---|
| Slimicide | Halogen to Hydantoin Ratio | PAE | A-PAM | C-Starch | C-PAM | AKD |
| $Cl_{0.5}$ dimethyl hydantoin | 0.5:1 | 0.18 | >4.6 | 0.77 | 0.77 | 0.92 |
| Dantochlor ® | 2:1 | 0.16 | <4.2 | 0.7 | 0.7 | 0.84 |
| $Cl_{0.75}Br_{0.25}$ dimethyl hydantoin | 1:1 | 0.063 | 0.20 | 0.4 | 0.19 | 0.44 |
| Dantobrom ® | 2:1 | 0.026 | 0.085 | 0.17 | 0.08 | 0.19 |

These results show that $Cl_{0.5}$ dimethyl hydantoin is more effective in the presence of performance additives which degenerate oxidants than Dantochlor® and Dantobrom®. These results also show that $Cl_{0.75}Br_{0.25}$ dimethyl hydantoin is more effective in the presence of performance additives which degenerate oxidants than Dantobrom®, which contains twice as much chlorine and bromine per mole of hydantoin.

All patents, publications, applications, and test methods mentioned above are hereby incorporated by reference. Many variations of the present matter will suggest themselves to those skilled in the art in light of the above detailed description. All such obvious variations are within the patented scope of the appended claims.

What is claimed is:
1. A method of reducing slime in a circulating water slurry comprising organic matter and a performance additive, while minimizing decomposition of the performance additive, the method comprising adding partially halogenated hydantoin to the slurry, wherein the concentration of partially halogenated hydantoin maintained in the slurry is from about 0.01 to about 50 ppm (expressed as $Cl_2$) and the partially halogenated hydantoin is $X_{(2-n)}$ dialkylhydantoin, where X is chlorine, bromine, iodine, or a combination thereof and n is from about 0.5 to about 1.5.

2. The method of claim 1, wherein the performance additive is a performance polymer.

3. The method of claim 1, wherein the performance additive is selected from the group consisting of optical brighteners, dyes, sizings, wet strength additives, dry strength additives, retention aids, drainage aids, biodispersants, and any combination of any of the foregoing.

4. The method of claim 3, wherein the performance additive is an optical brightener.

5. The method of claim 4, wherein the optical brightener is selected from the group consisting of sulfonated stillbenes, sulfonated biphenyls, and any combination of any of the foregoing.

6. The method of claim 3, wherein the performance additive is a biodispersant.

7. The method of claim 1, wherein the partially halogenated hydantoin is $X_{(2-n)}$ di-$(C_1–C_{10})$ alkyl hydantoin.

8. The method of claim 7, wherein the partially halogenated hydantoin is $X_{(2-n)}$ di-$(C_1–C_4)$ alkyl hydantoin.

9. The method of claim 8, wherein the partially halogenated hydantoin is $X_{(2-n)}$ 5,5-dimethyl hydantoin.

10. The method of claim 8, wherein the partially halogenated hydantoin is $X_{(2-n)}$ 5-methyl-5-ethyl hydantoin.

11. The method of claim 1, wherein the partially halogentated hydantoin is selected from the group consisting of $Cl_{0.5}$-5,5-dimethyl hydantoin, $Cl_{0.9}$-5,5-dimethyl hydantoin, $Cl_{1.1}$-5,5-dimethyl hydantoin, $Cl_{1.05-1.4}$-5,5-dimethyl hydantoin, monochloro-5,5-dimethyl hydantoin, $Br_{0.9}$-5,5-dimethyl hydantoin, monobromo-5,5-dimethyl hydantoin, $Cl_{0.5}$-5-methyl-5-ethyl hydantoin, $Cl_{0.9}$-5-methyl-5-ethyl hydantoin, $Cl_{1.1}$-5-methyl-5-ethyl hydantoin, $Cl_{1.05-1.4}$-5-methyl-5-ethyl hydantoin, monochloro-5-methyl-5-ethyl hydantoin, $Br_{0.9}$-5-methyl-5-ethyl hydantoin, monobromo-5-methyl-5-ethyl hydantoin, and any combination of any of the foregoing.

12. The method of claim 1, wherein the partially halogentated hydantoin is monochloro-5,5-dimethyl hydantoin.

13. The method of claim 1, wherein the partially halogentated hydantoin is $Cl_{0.5}$-5,5-dimethyl hydantoin.

14. The method of claim 1, wherein the partially halogentated hydantoin is $Cl_{0.9}$-5,5-dimethyl hydantoin.

15. The method of claim 1, wherein the partially halogentated hydantoin is $Cl_{1.1}$-5,5-dimethyl hydantoin.

16. The method of claim 1, wherein the partially halogenated hydantoin is a solid.

17. The method of claim 1, wherein the partially halogenated hydantoin is added to the slurry as an aqueous solution.

18. The method of claim 1, wherein the concentration of partially halogenated hydantoin maintained in the slurry is a slimicidally effective amount.

19. The method of claim 1, wherein the concentration of partially halogenated hydantoin maintained in the slurry is from about 0.1 to about 5 ppm (expressed as $Cl_2$).

20. The method of claim 1, wherein the slurry comprises from about 0.2 to about 18 percent by weight of organic matter, based upon 100% total weight of slurry.

21. The method of claim 1, wherein the organic matter is from about 90 to about 99 percent by weight wood fiber, based upon 100% total weight of organic matter.

22. The method of claim 1, wherein the slurry further comprises a second slimicide.

23. A method of reducing slime in a circulating water slurry for making paper, the slurry comprising organic matter and a performance additive, while minimizing decomposition of the performance additive, the method comprising adding partially halogenated hydantoin to the slurry, wherein the concentration of partially halogenated hydantoin maintained in the slurry is from about 0.01 to about 50 ppm (expressed as $Cl_2$) and the partially halogenated hydantoin is $X_{(2-n)}$ dialkylhydantoin, where X is chlorine, bromine, iodine, or a combination thereof and n is from about 0.5 to about 1.5.

24. A method of reducing slime in a circulating water slurry for making paper, the slurry comprising organic matter and an optical brightener, while minimizing decomposition of the optical brightener, the method comprising adding partially halogenated hydantoin to the slurry, wherein the concentration of partially halogenated hydantoin maintained in the slurry is from about 0.01 to about 50 ppm (expressed as $Cl_2$) and the partially halogenated hydantoin is $X_{(2-n)}$ dialkylhydantoin, where X is chlorine, bromine, iodine, or a combination thereof and n ranges from about 0.5 to about 1.5.

25. The method of claim 1, wherein n ranges from about 0.8 to about 1.2.

26. The method of claim 1, wherein n is greater than 0.75 and less than 0.95.

27. The method of claim 1, wherein n is greater than 1.05 and less than 1.4.

28. The method of claim 24, wherein n is greater than 0.75 and less than 0.95.

* * * * *